(12) United States Patent
Tilly et al.

(10) Patent No.: US 6,732,845 B2
(45) Date of Patent: May 11, 2004

(54) FLUID FRICTION CLUTCH

(75) Inventors: Christian Tilly, Uhldingen-Mühlhofen (DE); Thomas Buchholz, Meersburg (DE); Ulrich Niedermeier, Daisendorf (DE)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 10/117,656

(22) Filed: Apr. 5, 2002

(65) Prior Publication Data

US 2003/0006117 A1 Jan. 9, 2003

(30) Foreign Application Priority Data

Apr. 6, 2001 (EP) .............................. 01108715

(51) Int. Cl.$^7$ ................................ F16D 35/02
(52) U.S. Cl. .................................. 192/58.61
(58) Field of Search ............ 192/58.61, 58.63, 192/58.8, 82 T; 123/41.12

(56) References Cited

U.S. PATENT DOCUMENTS

| | | | |
|---|---|---|---|
| 4,265,348 A | * 5/1981 | Clarke | 192/58.61 |
| 4,305,491 A | * 12/1981 | Rohrer | 192/58.61 |
| 4,346,797 A | * 8/1982 | Bopp | 192/58.61 |
| 5,992,594 A | * 11/1999 | Herrle et al. | 192/58.61 |
| 6,026,943 A | * 2/2000 | Fuchs et al. | 192/58.61 |
| 6,032,775 A | * 3/2000 | Martin | 192/58.61 |
| 6,220,416 B1 | * 4/2001 | Katoh et al. | 192/58.682 |
| 6,419,064 B1 | * 7/2002 | Krammer | 192/58.61 |

FOREIGN PATENT DOCUMENTS

JP 03061727 A * 3/1991 ........... F16D/35/02

* cited by examiner

Primary Examiner—Richard M. Lorence

(57) ABSTRACT

A fluid friction clutch, in particular for the fan of the radiator of an internal combustion engine, is described. A valve element (22) controlling the clutch is operated via a solenoid control by means of a piston rod (24) which is guided coaxially in the drive shaft (12) of the clutch. The piston rod (24) includes an anchor (28), which is guided in the drive shaft (12). An actuator coil (34) is received in the magnet body (32), which is seated rotatably upon the drive shaft (12). The drive shaft (12) guiding the anchor (28) is provided with a non-magnetic separation gap (38).

8 Claims, 1 Drawing Sheet

FLUID FRICTION CLUTCH

TECHNICAL FIELD

The invention concerns a fluid friction clutch, in particular for a fan for the radiator of an internal combustion engine.

BACKGROUND OF THE INVENTION

A fluid friction clutch of this type is known from U.S. Pat. No. 4,305,491. The fluid friction clutch, frequently referred to as a viscous clutch, serves to drive a fan for the radiator of an internal combustion engine. The clutch is controlled by a temperature sensor. For this there is employed a solenoid or lifting magnet, which operates a valve element via a piston rod, which valve controls the supply of a viscous fluid in a work space, wherein this fluid effects a frictional engagement between the drive side and the driven side of the clutch mechanism.

The operation of the valve element by the piston rod, which is positioned coaxially within the drive shaft, makes it possible to place the solenoid and the control connections therefore upon the backside of the clutch and clutch driven fan. Thereby a space-saving and easy-to-assemble construction of the fan and clutch is made possible.

In the known fluid friction clutch, the entire solenoid mechanism as well as the piston rod operated thereby is integrated in the rotating drive shaft. It is thus necessary to introduce the activation current into the actuator coil, which is rotating along with the drive shaft, via a frictional contact, which contact is liable to frictional wear.

SUMMARY OF THE INVENTION

The invention is thus based upon the task of improving the fluid friction clutch of the above mentioned type, such that friction contacts liable to wear can be avoided.

In accordance with the invention, the anchor via which the piston rod is operated is guided coaxially directly in the hollow drive shaft. The armature coil, in contrast, is not integrated in the drive shaft, but rather is seated within a special magnet body, which coaxially surrounds the drive shaft and in which the drive shaft is rotatable. In this manner the magnet body can be fixedly assembled with the armature coil, so that no friction contacts are necessary for introduction of current into the armature coil. The drive shaft, at least in the part guiding and surrounding the anchor, is comprised of a soft magnetic material, wherein a separating gap of a non-magnetic material accomplishes that the magnet flow is not short-circuited in the drive shaft, but rather is guided through the anchor. Likewise, the magnet body is comprised of a soft magnetic material, so that the magnetic flow of the armature coil is guided through the magnet body, the area of the drive shaft surrounding the anchor, and the anchor. The fixed construction of the armature coil simplifies the construction and assembly and reduces the likelihood of defects.

The solenoid control can be so designed, that the anchor is moved between two end-positions. In such a so-called ON-OFF-control the clutch, and therewith the fan, are timewise activated in cycles. If the cycle frequency exceeds a boundary or limiting frequency as determined by the capability of the system (mass moment of inertia and viscosity of the fluid), then the anchor and the valve element can not carry out a complete stroke cycle within the period of the switch cycle, and the anchor and the valve element become positioned or set to an intermediate position in the stroke path. Thus, the position of the anchor along the stroke path, and therewith the degree of opening of the valve element, can be controlled via the cycle frequency, so that a continuous clutch engagement can be achieved.

In another embodiment the solenoid is controlled as a proportional solenoid. The hub position of the anchor can thereby be continuously adjusted within the total hub stroke length by the equilibrium of the forces acting upon the anchor, namely, on the one hand, the magnetic force determined by the energizing current and on the other hand the return spring force. By controlling the excitation current strength and the increasing entry of the anchor into the ferromagnetic area of the drive shaft, the continuous engagement of the clutch can be controlled in this embodiment.

Other benefits, features, and advantages of the present invention will become apparent from the following description of the invention, when viewed in accordance with the accompanying drawings and appended claims.

BRIEF DESCRIPTION OF THE DRAWINGS

In the following the invention will be described in greater detail on the basis of the embodiment shown in the drawings. In the drawings.

DESCRIPTION OF THE PREFERRED EMBODIMENT(S)

Figure 1:
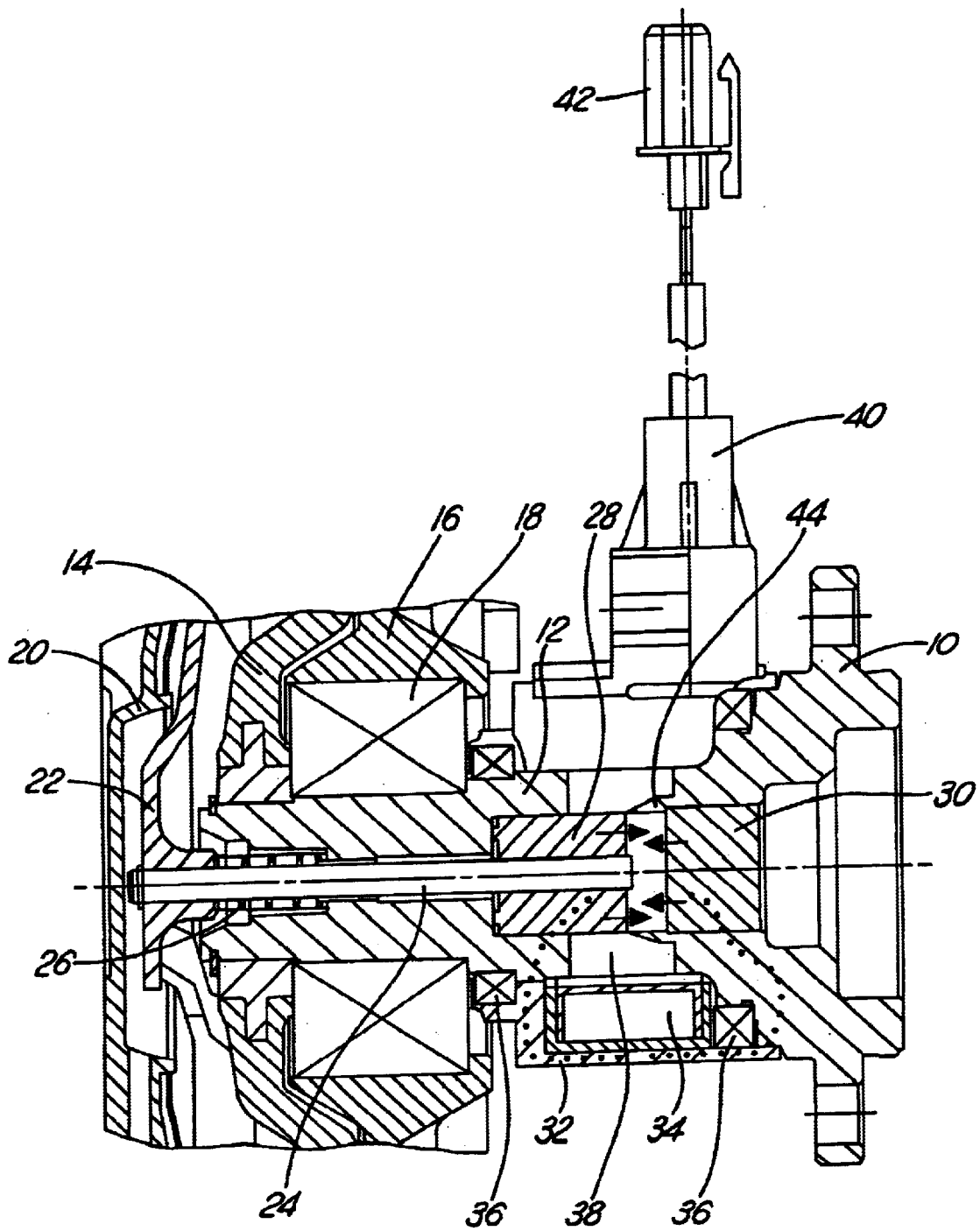
FIG. 1 shows an axial section through the operating means of a fluid friction clutch in accordance with the present invention.

The fluid friction clutch serves to drive a fan—not shown in detail in the drawing—for a radiator of an internal combustion engine via a—likewise not shown—driven shaft at the front of the motor (for example crank shaft, water pump shaft).

A clutch shaft or drive shaft 12 is secured fixed against rotation on the front end of this driven shaft by means of a flange 10. The drive shaft 12 is formed as a hollow shaft and is made of a soft magnetic material. On the front end of the drive shaft 12, on the side opposite to the flange 10, a fluid friction clutch is provided, via which the not-shown fan is drivable via the drive shaft 12.

The fluid friction clutch is comprised of a first drive side clutch means 14, which essentially has the shape of a disk and is seated fixed against rotation upon the front end of the drive shaft 12. A driven-side second clutch means is formed of a clutch housing 16, which is mounted rotatably upon the drive shaft 12 behind the first clutch means 14 via a bearing 18. The clutch housing 16 carries on its circumference the not-shown blades of the fan. On the clutch housing 16 there is sealingly secured a clutch housing cover 20. The clutch housing cover 20 closes off the clutch housing 16 on the front side and therewith forms a receiving space for the viscous fluid. The receiving space is divided by the first clutch means 14 into a supply space between the first clutch means 14 and the clutch housing cover 20 and a work space between the first clutch means 14 and the clutch housing 16.

The first clutch means 14 and the clutch housing 16 oppose or face each other via a disk shaped shear surface extending in the radial plane. Viscous fluid, which is situated in the work space enters between the shear surfaces, whereby first clutch means 14 driven by the drive shaft 12 takes along the coupling housing 16 under the frictional engagement, so that the fluid friction clutch engages and the fan is driven. A valve element 22 serves for controlling the fluid friction clutch, which is provided in the supply space and acts together with the valve opening, and allows the viscous fluid to pass from the supply space into the work space. If the valve element 22 is lifted axially from the first clutch means 14, that is, moved towards the left in FIG. 1, then it exposes the valve opening, so that fluid can enter into the work space and the friction engagement between the first clutch means 14 and the clutch housing 16 results. If the valve element 22 is moved against the first clutch means 14, that is, is moved to the right in FIG. 1, then it increasingly closes this valve opening, so that increasingly less and finally no fluid can any longer access the work space. The torque transmission from the first clutch means 14 to the clutch housing 16 and the fan is increasingly diminished and is finally completely interrupted.

The design of the fluid friction clutch and the valve element are not components of the invention and can be designed in any desired manner. A detailed description thereof is thus not necessary herein.

For operation of the valve element 22 there is employed the subsequently described lifting magnet or solenoid control.

In the drive shaft 12 formed as a hollow shaft there is guided an axially displaceable piston rod 24. Upon the front end of the piston rod 24, projecting out of the front end of the drive shaft 12, is secured the valve element 22. A return spring 26, which is designed as a helical compression spring, as received within the front end of the drive shaft 12 and surrounding the piston rod 24. The return spring 26 rests with its front end against the valve element 22 and with its rear end on an internal shoulder of the drive shaft 12, so that the return spring 26 pretensions the valve element 22 in the valve open position, that is, towards the left in the drawing.

On the rear end of the piston rod 24 is seated a cylindrical anchor 28 of a soft magnetic material. The anchor 28 is guided axially within a further widening or boring out of the axial inner bore of the drive shaft 12. The anchor 28 is moveable axially between a front stroke end-position and a rear stroke end-position. In the front stroke end-position the anchor 28 abuts axially against an inner shoulder of the drive shaft 12. In this stroke end-position, the valve element 22 is lifted from the valve opening, so that the viscous fluid can enter the workspace for engagement of the clutch. In the rear stroke end-position, the piston rod 24 abuts with the anchor 28 against an abutment 30 of a soft magnetic material, which closes off the anchor 28 guiding widened inner bore of the drive shaft 12 at the rear end. In the rear end position of the anchor 28, the valve element 22 closes the valve opening, so that the supply of fluid from the supply space into the workspace is interrupted and the clutch comes out of engagement.

On the outer circumference of the drive shaft 12, in the area of the anchor stroke path, is seated a magnetic body 32 of a soft magnetic material. The magnet body 32 surrounds the drive shaft 12 coaxially and encloses an armature coil 34, which is received in the inner circumference surface of the magnet body 32. The magnet body 32 is mounted axially on both sides of the armature coil 32 rotatably upon the drive shaft 12 via roller bearings 36.

The drive shaft 12, in the axial area which surrounds the receiving space for the anchor 28, is interrupted by a separation gap 38, which is comprised of a non-magnetizable material. The separation gap 38 is formed by a ring, which is seated in the jacket of the drive shaft 12, for example by welding, soldering or adhering. As can be seen from the drawing, the separation gap 38 is axially dimensioned and positioned such that the free rear surface of the anchor 28 during the stroke movement thereof axially moves within a conically rearward widening rim 44 of the soft magnetic jacket of the drive shaft 12. The increasing axial overlapping of the anchor 28 with the enlarging material thickness of the shoulder 44 produces a proportionality between the flow or energization of the armature coil 34 and the stroke force of the anchor 28. The armature coil 34 extends axially essentially over the length of the separation gap 38, whereby the inner jacket surface of the actuator coil 34 exhibits a sufficient radial play with respect to the drive shaft 12 and the separation gap 38, in order to make possible a free rotation. The magnet body 32 extends axially on both sides of the actuator coil 34 beyond the separation gap 38 and comes to overlap in the axial direction with the soft magnetic material of the drive shaft 12.

If a proportional control of the solenoid is not necessary (for example in an ON-OFF-drive), then the shoulder 44 can also be designed in a different shape, or the overlapping of the anchor stroke path with the soft magnetic material of the drive shaft 12 can be completely omitted.

The drive shaft 12 is coupled with the driven shaft via the flange 10 and thereby rotatingly driven. The magnet body 32 with the armature coil 34 is mounted positioningly fixed, so that the energizing current can be supplied to the armature coil 34 via a positionally fixed junction 40 and a plug connector 42. The solenoid control and its connection circuit are provided on the back side of the fluid friction clutch and fan and can be mounted positionally fixed. Thereby there results on the one hand a space saving and on the other hand, a constructively simple assembly.

In operation, the drive shaft 12 is driven via the driven shaft. An electronic control device controls the energization of the actuator coil 34 depending upon the cooling requirements (for example the cooling water temperature). If an increased cooling effect is necessary, then the supply of electricity to the armature coil 34 is interrupted. No magnetic force acts upon the anchor 28. The return spring 26 lifts the valve element 22 from the valve opening, so that fluid flows into the workspace and engages the coupling. The fan is driven.

If the cooling power is to be reduced, then the armature coil 34 is energized. The magnetic flow produced by the armature coil 34 is directed through the soft magnetic magnet body 32, the soft magnetic drive shaft 12 and the soft magnetic anchor 28 as well as the soft magnetic abutment 30, as shown using dotted lines in the drawing. The magnetic force acting upon the anchor 28 thereby increases, when the anchor moves towards the rear, that is towards the right in the drawing, and the cross section for the magnetic flow between the rear face of the anchor 28 and the magnetic shoulder 44 on the rear wall of the separation gap 38 is larger. The magnetic force acting upon the anchor 28, which moves the anchor towards the rear, acts against the return spring force of the return spring 26. During the operation as a proportional solenoid, the stroke position of the anchor 28, and therewith the degree of opening of the valve element 22, is determined by the equilibrium of these two forces. If the strength of the current supplied to the armature coil 34 increases, then the magnetic forces acting upon the anchor 28 increase, the anchor 28 moves towards the back and moves the valve element 22 increasingly in the closing position until the increasing return force of the return spring 26 balances the magnet force. In the rear end position of the anchor 28, the valve element 22 completely closes the valve opening, so that no fluid any longer enters in the workspace of the clutch. The fan is therewith no longer driven.

In the ON-OFF-operation the actuator coil 34 is so energized in cycles, that the anchor 28 is moved in its rear-most end-position or, as the case may be, the supply of current is interrupted, so that only the return spring 26 acts upon the anchor 28. If the alternation between energization and interruption occurs with such a high frequency that the anchor 28 on the basis of its inertia and upon the viscosity of the fluid acting upon the valve element 22 cannot completely follow this alternation, then the anchor 28 and therewith the valve element 22 set themselves to a intermediate position.

While particular embodiments of the invention have been shown and described, numerous variations and alternative embodiments will occur to those skilled in the art. Accordingly, it is intended that the invention be limited only in terms of the appended claims.

What is claimed is:

1. A fluid friction clutch, in particular for the fan of the radiator of an internal combustion engine, with a hollow drive shaft, with a first clutch element mounted fixed against rotation on the front end of the drive side of the drive shaft, with a second clutch element mounted rotatably upon the driven side of the drive shaft, with a valve element, which controls the supply of a viscous fluid for the fluid frictional coupling of the first and the second clutch elements, and with a solenoid control for the valve element comprising a piston rod provided coaxially within said hollow drive shaft, the front end of said piston rod projecting from said drive shaft and axially operating said valve element against the force of a return spring, an anchor provided on the rear end of piston rod, and an armature coil coaxially surrounding said anchor, thereby characterized, that said anchor (28) is guided coaxially within said drive shaft (12), that said drive shaft (12), at least in part guiding said anchor (28), is comprised of a soft magnetic material with a non-magnetic separation gap (38), that said armature coil (34) is seated in a magnet body (32) of soft magnetic material coaxially surrounding said drive shaft (12) and that said drive shaft (12) is rotatable within said magnet body (12).

2. The fluid friction clutch in accordance with claim 1 wherein said drive shaft (12) is mounted in said magnet body (32) with roller bearings (36).

3. The fluid friction clutch in accordance with claim 1 wherein said drive shaft (12) has a widened axial borehole therein and said anchor (28) is guided within a said widened borehole (12).

4. The fluid friction clutch in accordance with claim 1 wherein said solenoid control comprises a proportional solenoid or an ON-OFF switch magnet.

5. The fluid friction clutch in accordance with claim 3 wherein in the axial area transitioned by the rear end surface of the anchor (28) during the stroke movement thereof, within the separation gap (38), said drive shaft (12) has a widened shoulder (44) which increases in diameter towards said rear end.

6. The fluid friction clutch in accordance with claim 5 wherein said separation gap (38) is formed by a ring of a non-magnetizeable material interrupting, and seated in, said drive shaft (12).

7. The fluid friction clutch in accordance with claim 1 wherein the stroke position of said anchor (28) is controlled by the amplitude of the current supplied to said armature coil (34).

8. The fluid friction clutch in accordance with claim 1 wherein said armature coil (34) is time-wise energized in pulses, and the stroke position of said anchor (28) is determined by the pulse frequency of the energization.

* * * * *